United States Patent
King et al.

(10) Patent No.: US 10,441,078 B1
(45) Date of Patent: Oct. 15, 2019

(54) MOUNTING SYSTEM FOR A STORAGE SYSTEM

(71) Applicant: The Stow Company-Holland, Inc., Holland, MI (US)

(72) Inventors: Jonathan Jay King, East Grand Rapids, MI (US); Peter John Beebe, Holland, MI (US); Luke Charles Davis, Grand Rapids, MI (US)

(73) Assignee: THE STOW COMPANY-HOLLAND, INC., Holland, MI (US)

( * ) Notice: Subject to any disclaimer, the term of this patent is extended or adjusted under 35 U.S.C. 154(b) by 0 days.

(21) Appl. No.: 15/928,379

(22) Filed: Mar. 22, 2018

(51) Int. Cl.
*A47B 95/00* (2006.01)
*A47B 91/02* (2006.01)
*F16B 7/04* (2006.01)
*F16B 12/10* (2006.01)
*F16B 12/44* (2006.01)

(52) U.S. Cl.
CPC .............. *A47B 95/00* (2013.01); *A47B 91/02* (2013.01); *F16B 7/0446* (2013.01); *F16B 12/10* (2013.01); *F16B 12/44* (2013.01)

(58) Field of Classification Search
CPC ...... A47B 95/00; A47B 95/008; F16B 7/0446
See application file for complete search history.

(56) References Cited

U.S. PATENT DOCUMENTS

| | | | | |
|---|---|---|---|---|
| 3,733,755 A * | 5/1973 | Butler | ................... | E04B 2/7854 211/187 |
| 3,993,002 A * | 11/1976 | Stroh | ........................ | A47F 5/13 108/108 |
| 4,138,019 A * | 2/1979 | Smith | ................... | A47F 5/0807 211/190 |
| 4,301,767 A * | 11/1981 | Willinger | ............. | A01K 63/065 119/245 |
| 4,958,594 A * | 9/1990 | Swagerty | .................. | B60P 3/04 119/400 |
| 5,472,103 A * | 12/1995 | Merl | ..................... | A47B 47/022 211/187 |
| 5,495,952 A * | 3/1996 | Kainz | ................ | A47B 96/1416 211/90.04 |
| 5,509,541 A * | 4/1996 | Merl | ....................... | A47B 45/00 211/103 |
| 5,848,711 A * | 12/1998 | Schmit | ................. | A47B 95/008 211/90.04 |
| 5,996,506 A * | 12/1999 | Woytovich | ............. | A47B 96/02 108/42 |
| 6,044,986 A * | 4/2000 | Wood | ................... | A47B 57/425 211/103 |

(Continued)

OTHER PUBLICATIONS http://mixal.it/prodotti downloaded Feb. 20, 2018.

(Continued)

*Primary Examiner* — Stanton L Krycinski
(74) *Attorney, Agent, or Firm* — Warner Norcross and Judd LLP

(57) ABSTRACT

A mounting system for adjustably mounting a storage system to a wall is provided. The mounting system includes a horizontal rail to be secured to the wall, a stanchion spaced from the wall, and an adjustable knuckle assembly supporting the stanchion on the horizontal rail. The knuckle assembly is adjustable to move the stanchion toward and away from the wall, enabling the mounting system to accommodate plumb variations in the wall.

8 Claims, 10 Drawing Sheets

(56) References Cited

U.S. PATENT DOCUMENTS

| | | | | |
|---|---|---|---|---|
| 6,398,174 B1* | 6/2002 | Emalfarb | ............... | A47G 7/044 248/214 |
| 6,540,093 B1* | 4/2003 | Shumway | ............... | A47B 57/30 108/147.11 |
| 6,659,295 B1* | 12/2003 | De Land | ................ | A47B 96/04 211/184 |
| 6,848,589 B2* | 2/2005 | Wood | .................... | A47B 91/00 211/189 |
| 6,932,225 B2* | 8/2005 | Rowe | ..................... | A47B 57/30 211/90.02 |
| 7,401,705 B2* | 7/2008 | Craft | ...................... | A47B 96/00 211/103 |
| 7,506,772 B2* | 3/2009 | Chen | .................... | A47B 95/008 211/103 |
| 7,832,361 B2* | 11/2010 | Stevens | ................ | A01K 15/024 108/55.3 |
| 8,087,521 B2* | 1/2012 | Schwartzkopf | ...... | A47B 96/061 211/103 |
| 8,434,629 B2* | 5/2013 | Fernandez | ........... | A47B 96/067 211/103 |
| 8,646,624 B2* | 2/2014 | Fernandez | ............ | A47B 45/00 108/108 |
| 8,777,022 B2* | 7/2014 | Artigues | .............. | A47B 61/003 211/187 |
| 8,905,247 B2* | 12/2014 | Artigues | ............... | A47F 5/0018 211/187 |
| 8,998,009 B2* | 4/2015 | Kim | ..................... | A47B 95/008 211/103 |
| 9,770,122 B2* | 9/2017 | Gonzalez | ............. | A47B 57/565 |
| 2005/0109901 A1* | 5/2005 | Stitchick | .............. | A47B 47/022 248/235 |

OTHER PUBLICATIONS https://www.californiaclosets.com/virtuoso/ downloaded Feb. 20, 2018.
http://www.cinetto.it/en/Product/CG50-2/ downloaded Feb. 20, 2018.
http://www.cinetto.it/en/Product/CG50-1/ downloaded Feb. 20, 2018.
https://www.hafele.com/us/en/info/about-haefele/press-and-media/press-releases/sleight-of-hardware/59405/#SearchParameter=&@QueryTerm=Coloma&ContentType=Information&@P.FF.followSearch=9949&PageNumber=1&OriginalPageSize=12&Position=5&OrigPos=5&ProductListSize=5&PDP=true dated Jul. 19, 2017, downloaded Feb. 20, 2018.
https://www.hafele.com/INTERSHOP/web/WFS/Haefele-HAC-Site/en_US/-/USD/ViewParametricSearch-SimpleOfferSearch?SearchType=all&SearchTerm=coloma downloaded Feb. 20, 2018.
Vertiko Parts downloaded from https://www.richelieu.com; Feb. 20, 2018.

* cited by examiner

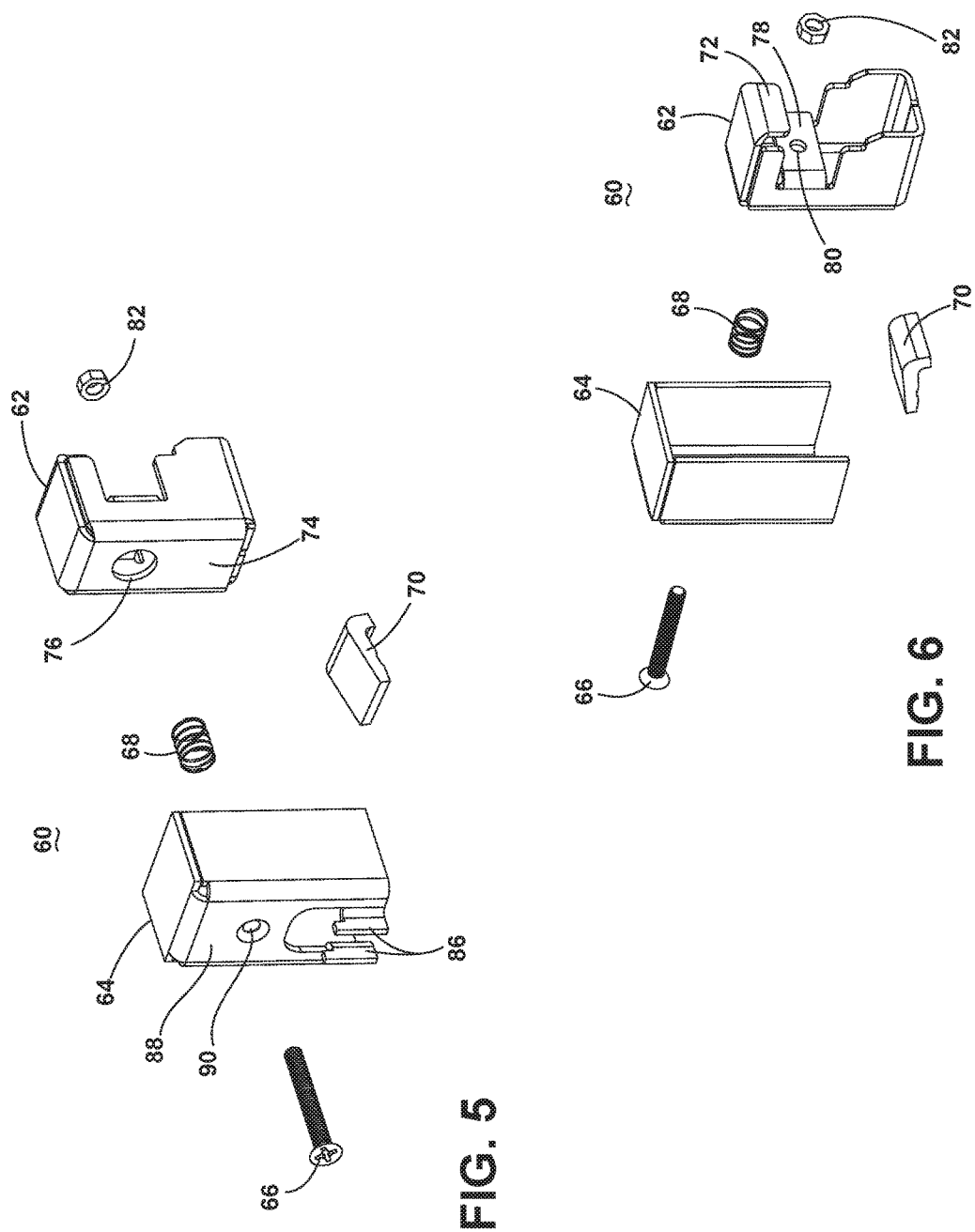

MOUNTING SYSTEM FOR A STORAGE SYSTEM

BACKGROUND OF THE INVENTION

The present invention relates to a mounting system for mounting a storage system to a wall, and more particularly to a mounting system that can accommodate plumb variations in the wall.

Closet storage systems, also referred to as closet organizers, are typically designed to be installed within a closet space in order to facilitate efficient use of the available storage space within the closet. Closet storage systems are designed to enable a user to customize the type and arrangement of storage options available within the closet, such as shelving designed for specific items (sweaters, shoes, etc.), sliding drawers or baskets, and rods for hanging items. The closet storage systems are often designed to include options that enable a user to customize the aesthetics of the space, such as the materials and finishes used for the components of the system.

Existing closet organizer systems that provide a "built-in" appearance typically include vertical partitions that are affixed to a horizontal rail securely mounted to the closet wall. The closet system is divided into various storage areas by vertical partitions. Storage elements, such as shelves, drawers, hanging rods, etc., are typically mounted to the vertical partitions.

Another type of "built0in" closet utilizes stanchions that support cantilever brackets and mount the back panel to the closet wall. Often, multiple fasteners are installed at various locations through the panels to further secure the panels to the wall. However, alignment and fit problems can arise when the wall, to which the closet system is being mounted, is not plumb, and/or the closet floor is not level. Irregularities and imperfections in the wall surface can cause problems during installation of the closet system, and can ultimately result in fit and finish issues for the installed system.

In addition to the multiple fasteners mentioned above, closet systems generally also include a variety of brackets and other visible hardware that, while they are functional, are not considered aesthetically pleasing. Visible fasteners, brackets, and other types of hardware detract from the perception that the closet system is an up-scale, built-in closet storage system.

SUMMARY OF THE INVENTION

The aforementioned issues are addressed by the present storage system and mounting system. The storage system is customizable and provides a clean look with fewer vertical interruptions. The mounting system can accommodate plumb variations in the wall to which the storage system is to be mounted.

According to an embodiment of the invention, a storage system configured to be mounted to a wall includes a horizontal rail adapted to be secured to the wall, a stanchion mounted to the horizontal rail, and a plurality of back panels. The stanchion defines opposed panel channels that open opposite one another. The stanchion further defines an interior and an access channel communicating with the interior. The access channel opens in a direction away from the horizontal rail, generally perpendicular to the panel channels. The back panels each have a side edge, and each side edge extends into one of the panel channels. The access channel provides access into the interior of the stanchion even with the back panels extending into the panel channels.

According to another embodiment, a mounting system for adjustably mounting a storage system to a wall includes a horizontal rail adapted to be secured to the wall, a stanchion spaced from the wall, and an adjustable knuckle assembly interconnecting the stanchion to the horizontal rail. The knuckle assembly is adjustable to move the stanchion toward or away from the wall, enabling the mounting system to accommodate plumb variations in the wall.

According to another embodiment, a method of mounting a storage system to a wall includes: providing a horizontal rail having a longitudinal length, securing the horizontal rail to the wall, providing an adjustable knuckle assembly, providing a stanchion, mounting the stanchion to the knuckle assembly, installing a wedge lock between the knuckle assembly and the stanchion to lock the knuckle assembly and stanchion together, mounting the knuckle assembly and stanchion to the horizontal rail, and adjusting the knuckle assembly to move the stanchion toward or away from the wall such that the mounting system accommodates variations from plumb in the wall.

These and other features and advantages of the invention will be more fully understood and appreciated by reference to the entire application including the specification, the claims, and the drawings.

BRIEF DESCRIPTION OF THE DRAWINGS

FIG. 5 is a front, exploded isometric view of a knuckle assembly of the mounting system;

FIG. 6 is a rear, exploded isometric view of a knuckle assembly of the mounting system;

DESCRIPTION OF THE CURRENT EMBODIMENTS

I. Structure

Figure 1:
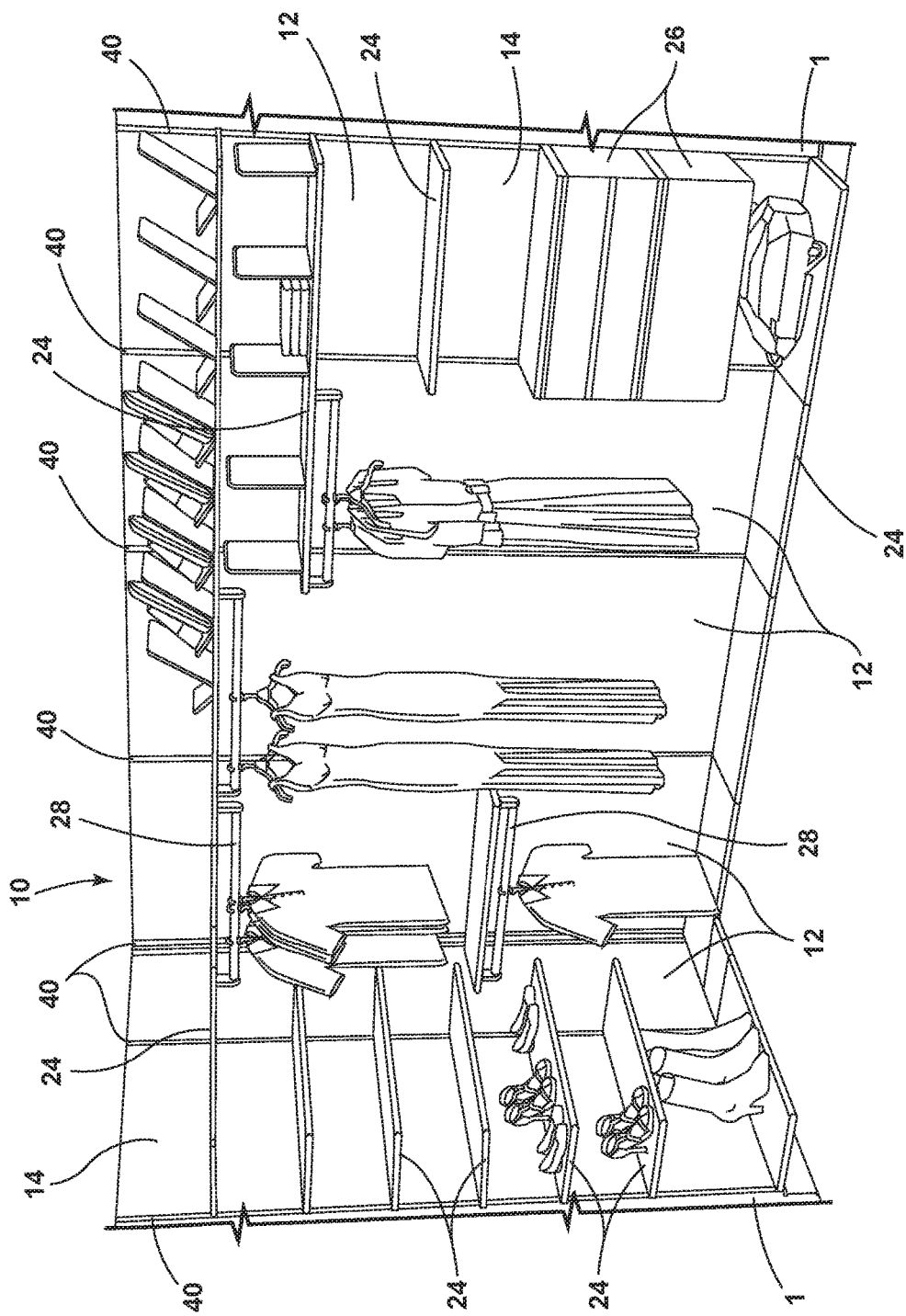
FIG. 1 is an isometric view of a storage system according to one embodiment.
Figure 2:
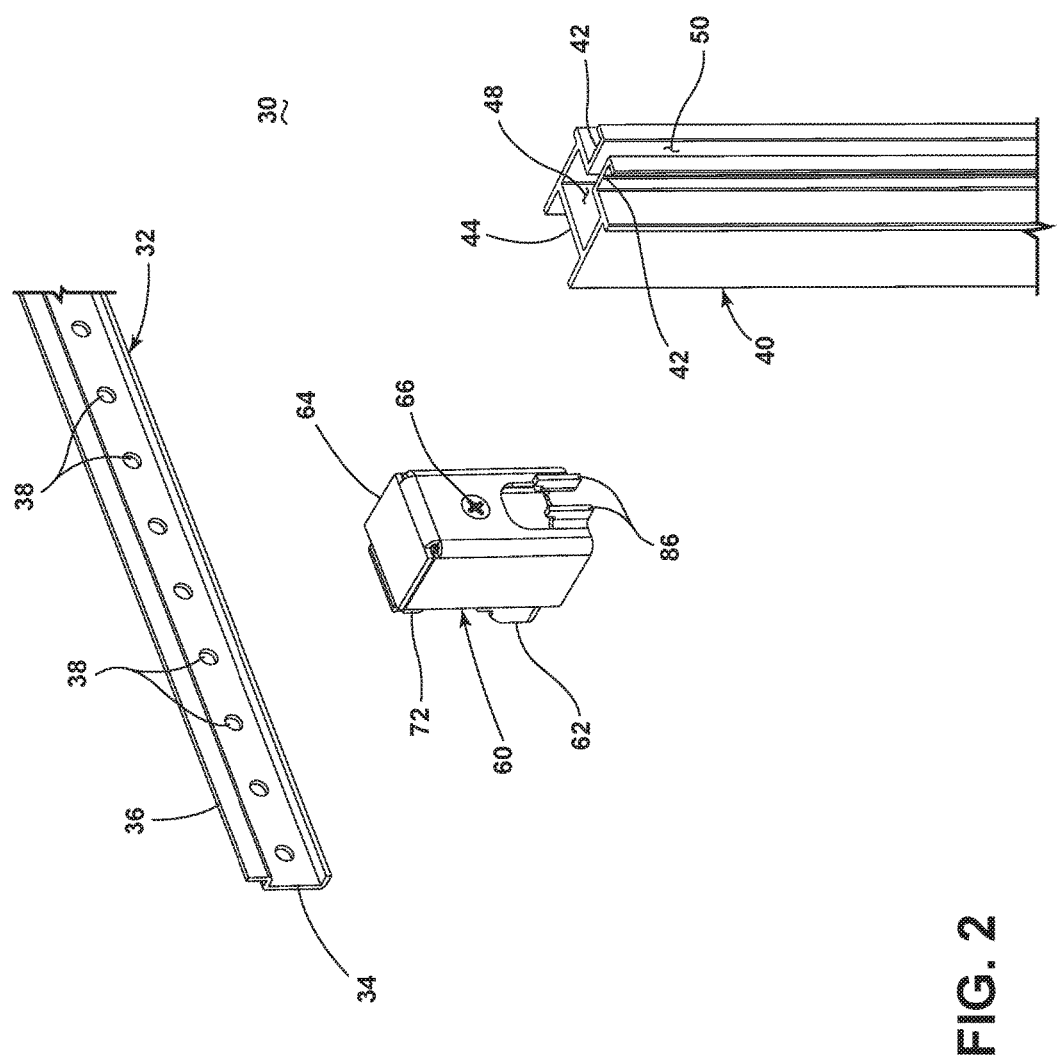
FIG. 2 is an exploded isometric view of a mounting system for mounting the storage system to a wall.

A storage system in accordance with an embodiment of the invention is illustrated in the drawings and designated 10. While the storage system 10 is illustrated and described in the context of use within a closet, it will be understood that the storage system 10 may be used in any room or enclosure in a residential or business setting. The storage system 10 is illustrated as being assembled adjacent a wall 1. While the embodiments of the invention are described in the context of the storage system 10 being positioned adjacent a wall, it will be understood that the storage system 10 may be used in any desired location and that the storage system 10 may be used adjacent other structures, non-limiting examples of which include windows, room dividers, and shelving units, in a manner similar to that described herein.

With reference to FIG. 1, the storage system 10 includes a plurality of back panels 12 positioned parallel to the closet wall 1, yet spaced from the wall 1 as described herein. Each back panel 12 defines a show surface 14, a rear surface 16, and opposed side edges 18. Each back panel 12 can have a height that generally defines the height of the closet storage system 10, although the back panels 12 can be provided having any desired height. For example, the back panels 12 may have a height less than the height of the wall height such that there is a gap between the top of the back panels 12 and the ceiling. As illustrated, the back panels 12 may be supported on a foot, as described in greater detail below. Additionally, the back panels 12 can optionally be provided in any desired width to accommodate different spacing as needed within the closet. The back panels 12 can also be formed of any suitable material, including but not limited to, a laminated material, plastic, wood, or the like.

The closet storage system 10 may include any combination of storage elements, non-limiting examples of which include shelving, sliding drawers or baskets, movable doors, hanging rods for supporting items on a hanger, valet hooks, shelf dividers, and a lower deck. The illustrated exemplary closet storage system 10 includes a plurality of shelves 24, a stack of drawers 26, and multiple clothes hanging rods 28. These storage elements can be provided in greater or lesser quantities and arranged as desired by the owner.

Referring now to FIGS. 2-6, the closet storage system 10 is configured to be adjustably mounted to the wall 1 by a mounting system 30. The mounting system 30 includes a horizontal rail 32 that is adapted to be secured to the wall 1. The rail 32 is formed as an elongated rail having a first leg 34 adapted to be fastened to the wall 1 and a second leg 36 that extends away from the wall 1, at an angle to or horizontally offset from the first leg 34. The rail can also include a series of spaced openings 38 through which fasteners may be inserted to affix the rail 32 to the wall 1. The rail 32 can have a standard length, for example eight feet, and can be formed from any suitable material, including but not limited to galvanized steel.

Figure 4:
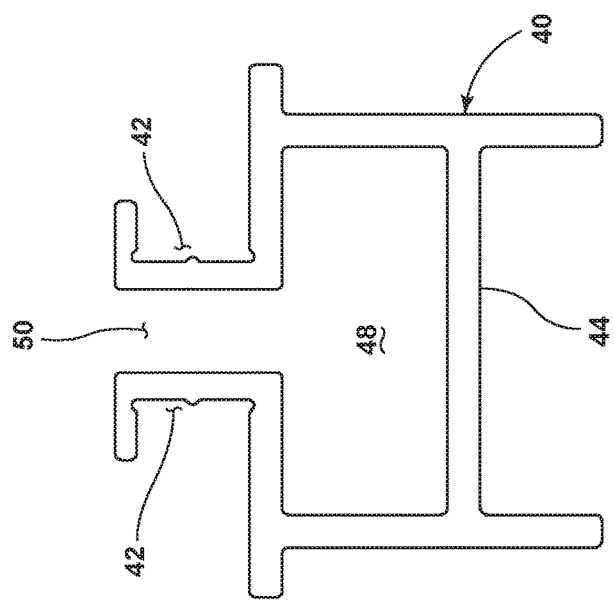
FIG. 4 is an end view of the stanchion.
Figure 3:
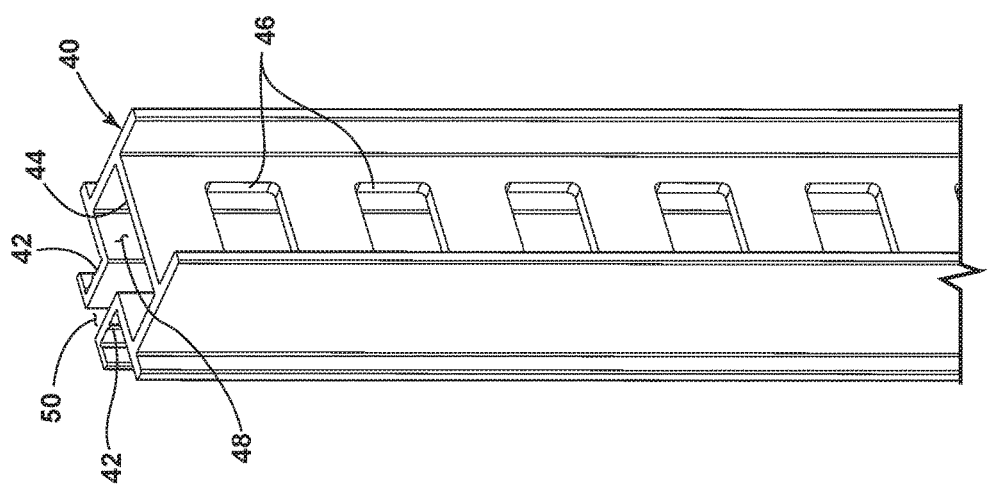
FIG. 3 is an isometric view of a stanchion of the mounting system.

The mounting system 30 also includes an elongated stanchion 40 configured to be removably affixed to the horizontal rail 32 and spaced from the wall 1. Referring in particular to FIGS. 3 and 4, the stanchion 40 defines opposed C-shaped panel channels 42 that open opposite one another. The panel channels 42 are disposed on a face of the stanchion 40 away from the rail 32, and the panel channels 42 are open in the direction parallel to the wall 1. The stanchion 40 has a substantially h-shaped (in cross-section) central portion with a beam 44 extending between the sides of the stanchion 40. The beam 44 can include a vertical series of spaced cutout openings 46. The stanchion 40 further defines an interior 48 and an access channel 50 in communication with the interior 48. The access channel 50 is disposed between the panel channels 42 and opens in the direction away from the rail 32 and generally perpendicularly to the panel channels 42. The stanchion 40 can have a standard length, for example eight feet, and can be formed from any suitable material, including but not limited to extruded aluminum.

Referring to FIGS. 5 and 6, the mounting system 30 includes an adjustable knuckle assembly 60 interconnects the stanchion 40 to the horizontal rail 32. The knuckle assembly 60 includes a rail bracket 62, a stanchion bracket 64, a fastener, illustrated in the figures as a screw 66, and a biasing member, illustrated in the figures as a compression spring 68. The knuckle assembly 60 may also include a wedge lock 70. The rail bracket 62 is received within the stanchion bracket 64 and the brackets are interconnected by the screw 66. The spring 68 is disposed between the walls of the stanchion bracket 64 and the rail bracket 62 to bias the brackets away from one another. The screw 66 extends through the spring 68 and may be adjusted or turned one direction or the other to increase or decrease the spacing between the rail bracket 62 and the stanchion bracket 64.

The rail bracket 62 is adapted to be mounted to or hung from the horizontal rail 32. The rail bracket 62 includes a hook 72 disposed on a rear, upper portion of the rail bracket 62. The hook 72 can be configured to receive the second leg 36 of the horizontal rail 32 to which the knuckle assembly 60 is to be mounted. The rail bracket 62 also includes a front wall 74 with an aperture 76 therethrough, and a crossbar 78 that extends between side walls of the rail bracket 62. The crossbar 78 also includes an aperture 80, and a nut 82 can be affixed to a rear surface of the crossbar 78. The apertures 76 and 80 and the nut 82 are aligned for receiving the screw 66 therethrough.

The stanchion bracket 64 includes a hook or hooks 86 extending from a front wall 88, away from the horizontal rail 32. The hooks 86 are configured to mount the stanchion 40 to the knuckle assembly 60. More particularly, a select one of the openings 46 through the stanchion beam 44 can be hung over the hooks 86. The front wall 88 can also include an aperture 90 configured to receive the screw 66 therein for interconnecting the stanchion bracket 64 and the rail bracket 62.

Figure 7:
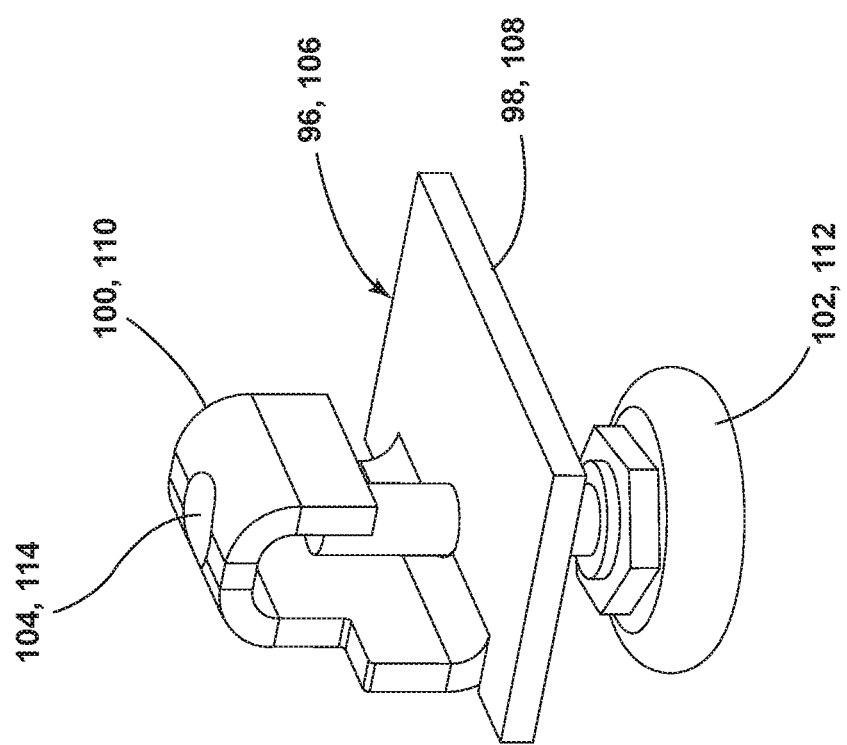
FIG. 7 is side isometric view of a leveler assembly and/or a back leveler assembly for the storage system.

Referring to FIG. 7, the closet storage system 10 can also include a leveler assembly 96 configured to be vertically affixed to a lower end of the stanchion 40. The leveler assembly 96 includes a bracket 98 that can include an insert 100 extending therefrom and a leveler foot 102 that can contact the flooring surface. The leveler assembly 96 can bear a majority of the weight of the relevant portion of the closet storage system 10, and the lower ends of the stanchion 40 and the back panels 12 (when installed) are supported atop the bracket 98. The insert 100 is configured to be inserted into the stanchion 40 to affix the leveler assembly 96 thereto. The insert 100 includes a hole 104, the purpose of which will be described hereinafter. The position of the leveler foot 102 is vertically adjustable with respect to the bracket 98 so as to accommodate any height variation in the flooring surface relative to the horizontal rail 32 from which the closet storage system 10 is hung.

The closet storage system 10 can also include a back leveler assembly 106 that may be substantially similar to the leveler assembly 96. The back leveler assembly 106 is configured to be horizontally affixed to a rear of the stanchion 40. The back leveler assembly 106 includes a bracket 108 that can include an insert 110 extending therefrom and an adjustable leveler foot 110 that can contact the wall 1. The insert 110 is configured to be inserted into the stanchion 40 to affix the back leveler assembly 106 thereto. The insert 110 includes a hole 114, the purpose of which will be described hereinafter. The position of the leveler foot 110 is horizontally adjustable with respect to the bracket 108 to move the stanchion 40 toward or away from the wall 1 to accommodate any surface or plumb variations in the wall 1. Additionally, multiple back leveler assemblies 106 can be affixed to the rear of the stanchion 40 to provide structural support along the length of the stanchion 40. For example, one back leveler assembly 106 can be positioned substantially near the lower end of the stanchion 40, and optionally, another back leveler assembly 106 can be positioned spaced between the knuckle assembly 60 and the first back leveler assembly 106. Of course, back leveler assemblies 106 can be at any desired vertical location along the stanchion 40.

Each of the back leveler assemblies 106 is individually adjustable to compensate for any irregularities in the wall 1 and to provide rigidity to the closet storage system 10 particularly when storage elements such as drawers 26 are opened and closed. The back leveler assemblies 106 can be installed onto the stanchion 40 with the foot 110 positioned at substantially half the foot's total adjustable travel or distance. Of course, it should be understood that the back leveler assemblies could be installed at zero travel or full travel also.

For the sake of brevity, the stanchion 40 and the knuckle assembly 60 are described in the context of a single stanchion 40 and a single knuckle assembly 60, although it will be understood that the closet storage system 10 can include multiple stanchions 40 and multiple knuckle assemblies 60. Additionally, for as many stanchions 40 that are included in the closet storage system 10, a leveler assembly 96 may be provided at the lower end of each. As mentioned above, multiple back leveler assemblies 102 can be provided for each stanchion 40 also.

II. Installation

An exemplary method of mounting the closet storage system 10 to the wall 1 using the mounting system 30 is now described and illustrated in FIGS. 8-12. The horizontal rail 32 can be secured to the wall 1 at a desired height above the floor using any suitable fasteners. For example, a length of horizontal rail 32 can be mounted and secure to studs of the wall 1, using screws or the like, which can be inserted through the openings 38 in the first leg 36 of the rail 32. Rails 32 are typically aligned, end-to-end, along a desired length of the wall 1.

Figure 8:
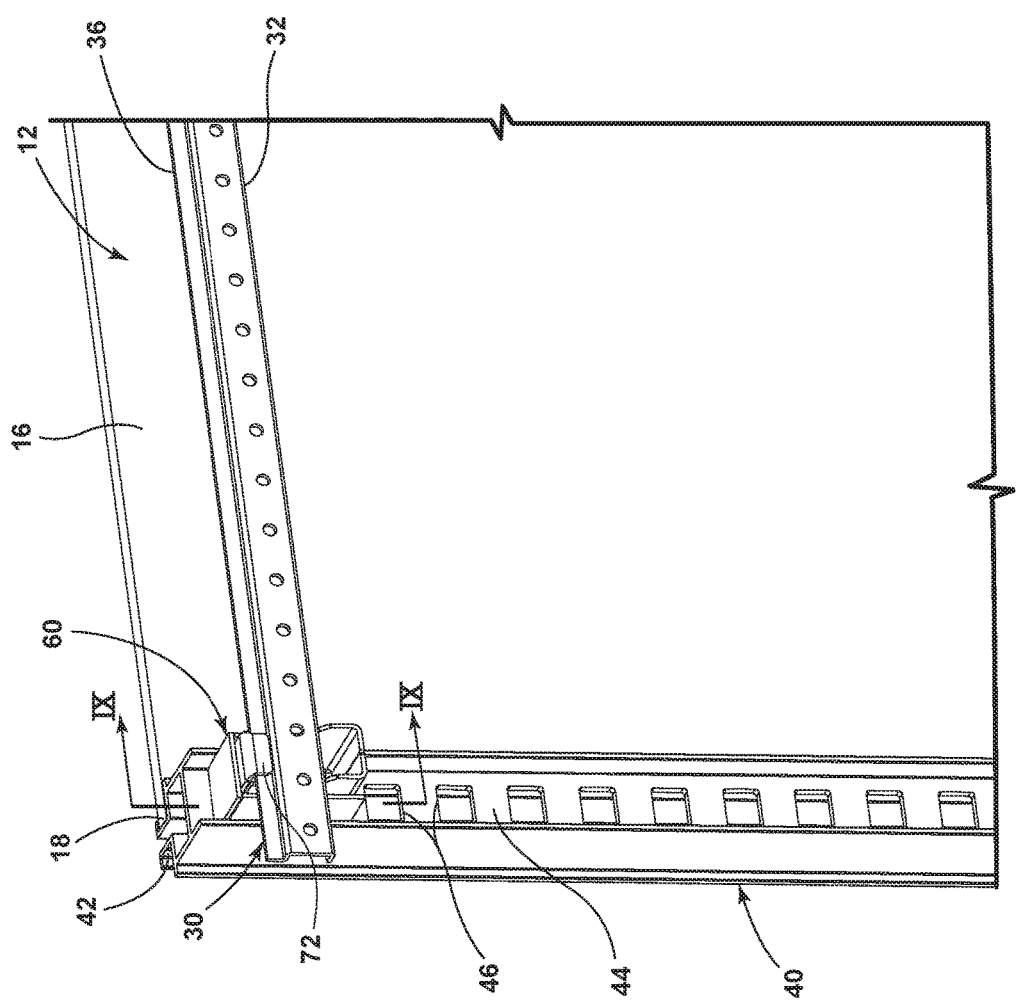
FIG. 8 is a rear isometric view of the mounting system and an installed back panel.
Figure 9:
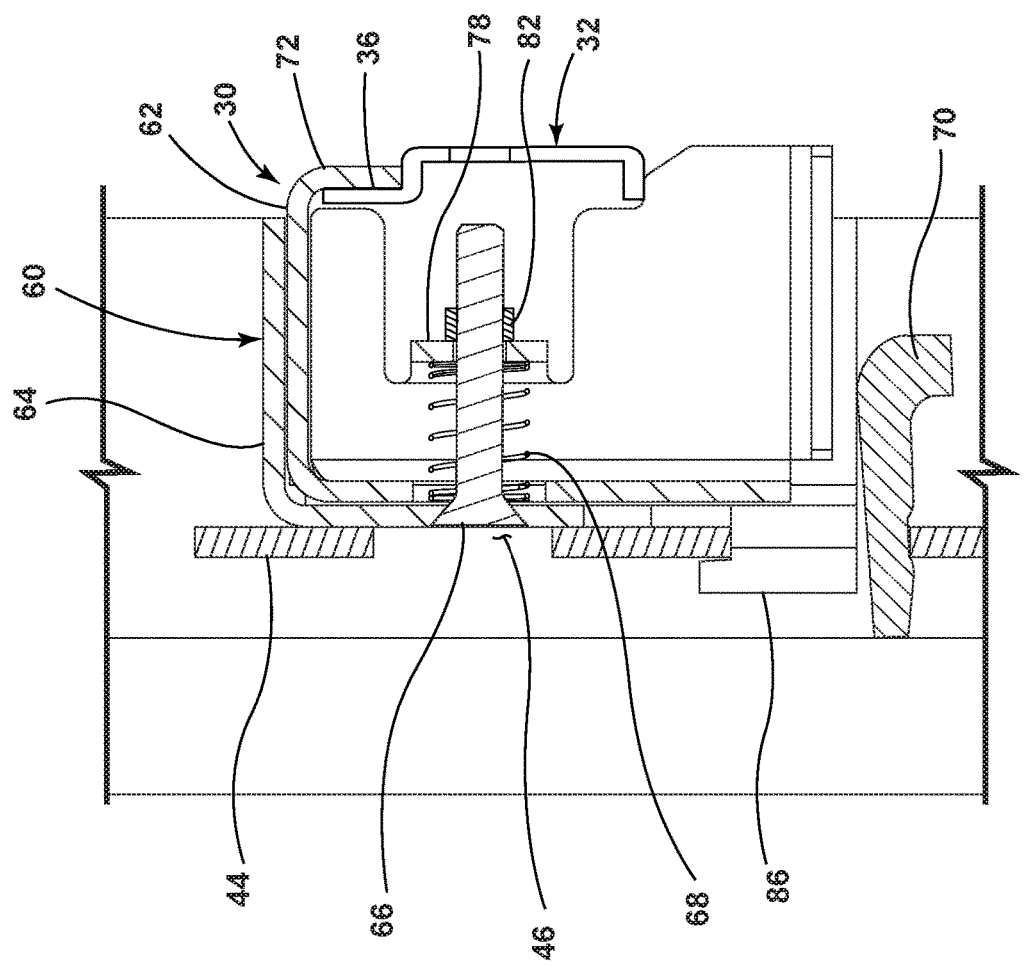
FIG. 9 is a cross-sectional view of the mounting system taken along line IX-IX of FIG. 8.

Referring in particular to FIGS. 8 and 9, a stanchion 40 can be mounted to the knuckle assembly 60 by simply hanging the opening 46 in the stanchion beam 44 over the hooks 86 of the stanchion bracket 64. The beam 44 includes a series of openings 46, therefore the opening 46 corresponding to the desired height that the stanchion 40 is to be mounted to the horizontal rail 32 can be selected. For example, the knuckle assembly 60 can be mounted to the upper-most opening 46 in the beam 44. The knuckle assembly 60 can be provided at installation with minimal spacing between the rail bracket 62 and the stanchion bracket 64. In this case, the fastener 66 can then be adjusted as needed to increase the spacing between the rail bracket 62 and the stanchion bracket 64. Of course, it should be understood that the knuckle assembly 60 could be provided at installation with any desired spacing between the rail and stanchion brackets 62, 64.

Once the stanchion 40 is mounted to the knuckle assembly 60, the wedge lock 70 can be inserted or wedged into the gap between the bottom of the knuckle assembly 60 and the opening 46 in the stanchion 40 to lock the components together and prevent the stanchion 40 from dislodging from the knuckle assembly 60 once installed on the rail 32.

Figure 12:
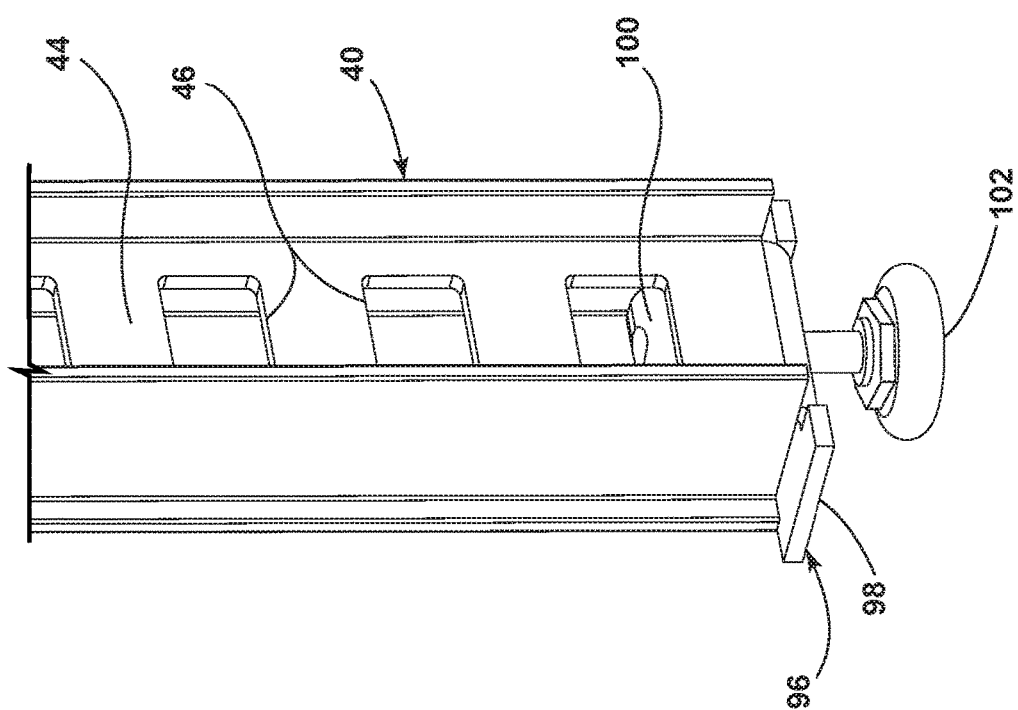
FIG. 12 is a detail view of the leveler assembly mounted to the lower end of the stanchion.

A leveler assembly 96 can then be affixed to the lower end of the stanchion 40 by inserting the insert 100 into the end of the stanchion 40, as shown in FIG. 12. One or more back leveler assemblies 106 can also be affixed to the rear of the stanchion 40 as desired by inserting the clips 108 into stanchion 40. For example, a first back leveler assembly 106 can typically be installed near a lower end of the stanchion 40, and a second back leveler assembly 106 can be installed near the mid-point of the stanchion 40. Of course, more or fewer back leveler assemblies 106 can be included on each stanchion 40, as preferred.

Figure 10:
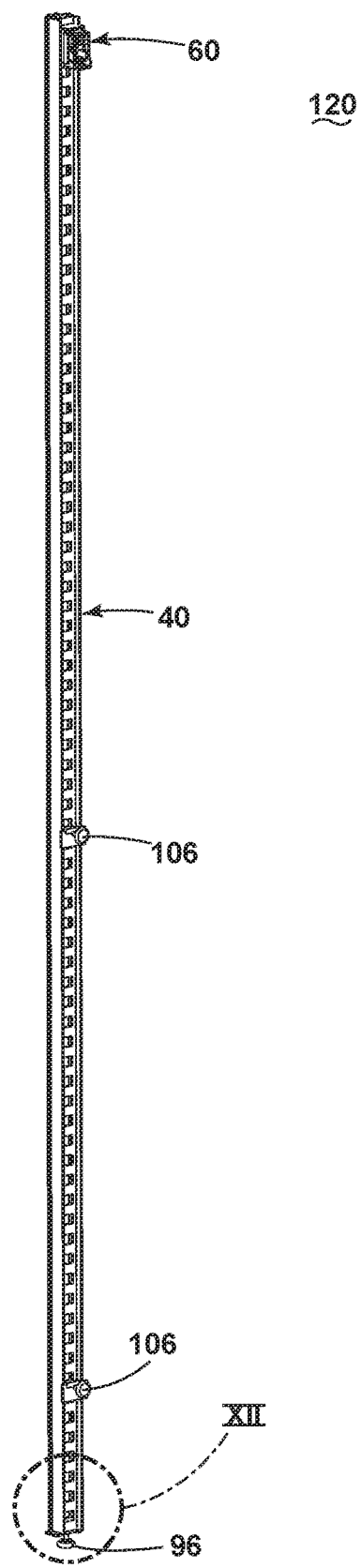
FIG. 10 is an isometric view of a stanchion assembly of the storage system.

The stanchion 40, knuckle assembly 60, and leveler assemblies 96, 106 together as assembled define a stanchion assembly 120, illustrated in FIG. 10. The stanchion assembly 120 can be mounted to the horizontal rail 32 in any desired position along the rail 32. To mount the stanchion assembly 120 to the rail 32, the stanchion assembly 120 is hung so that the hook 72 of the knuckle assembly rail bracket 62 receives the second leg 36 of the rail 32. Of note, as installed, the rear of the stanchion 40 is spaced from the surface of the wall 1. Multiple stanchion assemblies 120 can be mounted to the rail 32. The number and spacing of the stanchion assemblies 120 included may be based on the dimensions of the closet and the desired configuration of the closet storage system 10 to be installed. Depending on the desired configuration, the closet storage system 10 may be installed with fewer or additional stanchion assemblies 120 than those illustrated in FIG. 1.

Figure 11:
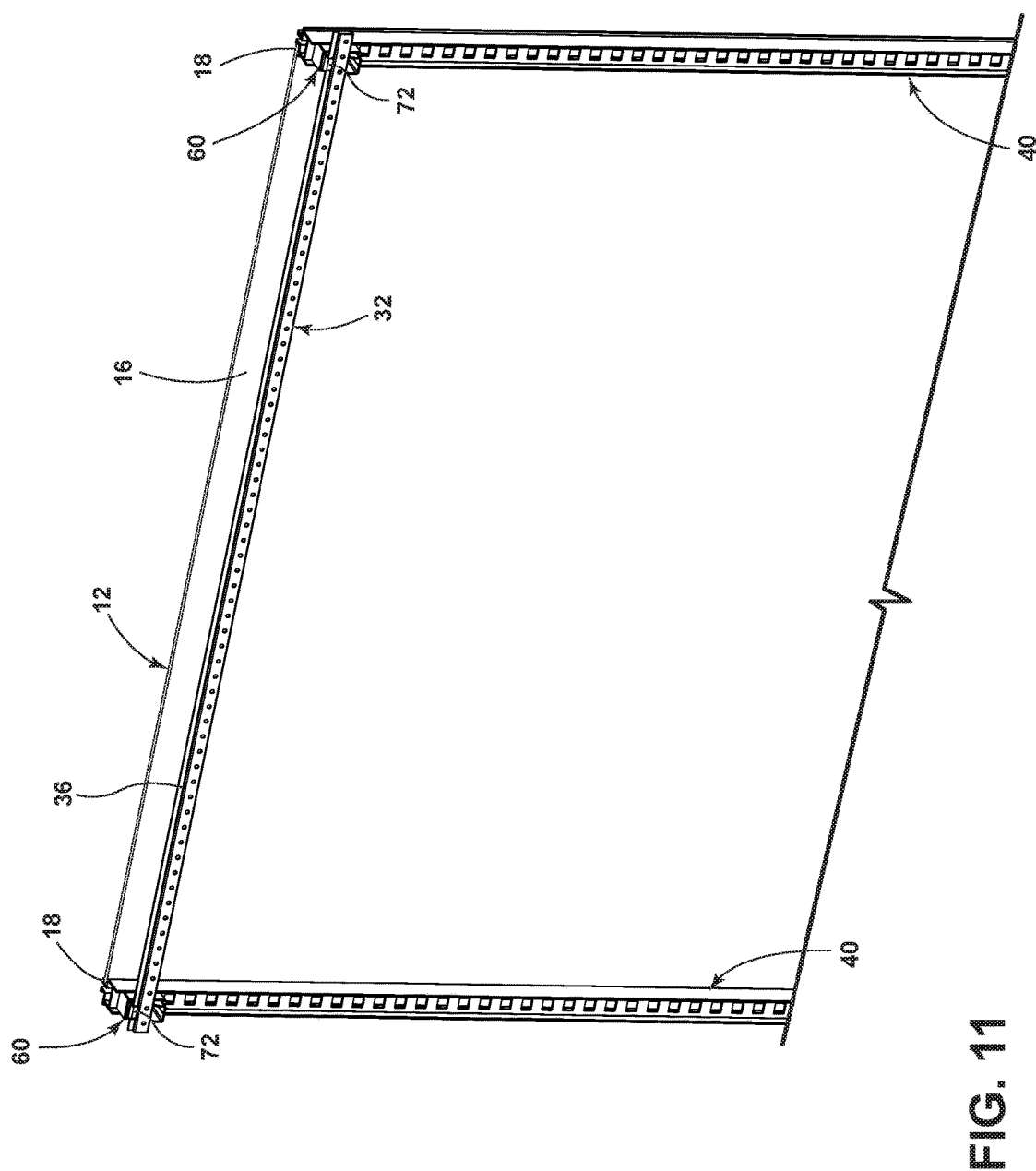
FIG. 11 is a rear isometric view of a back panel installed between adjacent stanchion assemblies.

With reference now to FIG. 11, once the desired number of stanchion assemblies 120 have been installed, the back panels 12 may be installed into the spaces between adjacent stanchion assemblies 120. Although described above as hanging all of the stanchion assemblies 120 prior to installing the back panels 12, it will be understood that the assembly of the stanchion assemblies 120 and back panels 12 can occur in any desired sequential or non-sequential order. For example, a user may be decide to assemble a first and second stanchion assembly 120 with a first back panel 12 before assembling the next stanchion assembly 120. In addition, while it is generally more efficient to assemble the closet storage system 10 in its end location adjacent the wall 1, it will be understood that a portion of the closet storage system 10 may be assembled elsewhere and then moved into its end location adjacent the wall 1.

The back panel 12 is installed by inserting one of the side edges 18 into the corresponding panel channel 42 defined by the stanchion 40. The remaining side edge 18 can be inserted into the corresponding panel channel 42 of the adjacent stanchion 40. The process can be repeated for each back panel 12. The back panels 12 positioned at the ends of the horizontal rail 32 may be intended to be flush with an adjacent wall or may include an additional end cap trim piece. During installation, a suitable adhesive may be applied to the side edges 18 of the back panel 12 to help retain the side edge 18 as received in the panel channel 42. Like the installed stanchion assemblies 120 the back panels 12 are spaced from the wall 1. In this manner, the assembled closet storage system 10 includes a raceway behind the back panels 12 and stanchion assemblies 116. Although not shown in the figures, these raceways may be used to accommodate features that project away from the wall 1, such as electrical or cable outlets, or to provide a pathway through which electrical wiring or other cables can traverse.

The access channel 50 of the stanchion 40 provides access into the interior 48 of the stanchion 40, even with the back panels 12 installed into the panel channels 42. Therefore, the adjustable components—the knuckle assembly 60, leveler assembly 96, and back leveler assembly 106—can be adjusted after the back panels 12 have been installed. As described above, the adjustable knuckle assembly 60, which interconnects the stanchion 40 to the horizontal rail 32, can be adjusted by turning the screw 66 to increase or decrease the spacing between the rail bracket 62 and the stanchion bracket 64. The screw 66 is accessible through the access channel 50 and the aligned beam 44 opening 46. The access channel 50 is configured to have a width sized for a screwdriver or similar tool to be inserted into the access channel 50 for engaging the screw 66. Each knuckle assembly 60 on each stanchion 40 can be adjusted individually to move the stanchions 40 toward or away from the wall 1 as desired to accommodate any plumb variations, unevenness, or defects in the wall 1 behind the closet storage system 10.

For further adjustment, the back leveler assembly 106, which extends from the rear of the stanchion 40, can be horizontally adjusted to appropriately contact the wall 1. As described with respect to the knuckle assembly 60, the adjustable foot 112 of the back leveler assembly 106 is accessible through the access channel 50 and aligned opening 46 through the beam 44 of the stanchion 40. A screwdriver or similar tool can be inserted into the access channel 50, through the hole 114 in the insert 110, to engage the adjustable foot 112. The foot 112 can be turned to increase or decrease the spacing between the foot 112 and the wall 1. Each back leveler assembly 106 can be adjusted individually to provide proper vertical alignment, relative to the adjusted knuckle assembly 60 installed above, and support along the length of the stanchion 40. Again, the back leveler assemblies 106 are individually adjustable to accommodate any variations, unevenness, or defects in the wall 1, and each stanchion 40 in the closet storage system 10 can be aligned accordingly.

Additionally, the leveler assembly 96, which is mounted to the lower end of the stanchion 40, can be vertically adjusted to appropriately contact the floor to provide a proper amount of support for the stanchion 40. The foot 102 of the leveler assembly 96 is accessible below the stanchion 40 and can be turned to increase or decrease the spacing between the foot 102 and the floor surface below. The leveler assemblies 96, mounted to the lower end of each stanchion 40, are individually adjustable to provide proper support and accommodate any variation or unevenness in the floor.

Mounting hardware, such as shelf brackets (not shown) with inverted J-shaped hooks, for example, may be used to attach and/or secure a variety of storage elements to the closet storage system 10. Such arrangements for mounting brackets to a slotted vertical rail are traditional in the field of closets. In the present closet storage system 10, shelf brackets can be inserted through the stanchion access channel 50, and hooked into the openings 46 of the stanchion beam 44. Cantilevered shelf brackets and other similarly mountable brackets may be used to mount shelving, sliding drawers or baskets, movable doors, hanging rods, valet hooks, shelf dividers, and/or a lower deck. A wide variety of storage elements can be installed utilizing the stanchions 40 and brackets. The arrangement and inclusion of such storage elements can be readily customized to suit the user's needs and/or desires and the illustrations and examples provided herein are for explanatory purposes only and are not intended to limit the scope of the invention.

III. Conclusion

The embodiments described herein provide for a storage system and mounting system that is visually appealing and configured to accommodate uneven walls to which the storage system is mounted. Unlike traditional closet systems, the present storage closet system does not include the traditional vertical partitions between which shelves and hanging rods are typically mounted. Eliminating the vertical partitions between storage elements provides a clean look with fewer vertical interruptions. Only the thin strips of the stanchion panel channels are visible from the show side of the closet system, and the minimal visual interruption lends the perception that the closet storage system is an up-scale, built-in closet storage system.

The mounting system of the present invention provides a solution to a common problem of installing components to a wall that may be uneven or includes irregularities or imperfections. Alignment and fit issues of the closet components themselves can arise when the wall or floor to which the closet system is being installed is not plumb or level, giving a cheap and poor craftsmanship look to the system. The present mounting system can accommodate plumb variations in the wall by utilizing adjustable knuckle assemblies and leveler assemblies. This arrangement spaces the stanchions and back panels from the wall. The vertical alignment of the stanchions, and thus the back panels as well, is fully adjustable to ensure that the stanchions are actually vertical.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The invention claimed is:

1. A mounting system for adjustably mounting a storage system to a wall, the mounting system comprising:
   a horizontal rail adapted to be secured to the wall;
   a stanchion spaced from the wall; and
   an adjustable knuckle assembly interconnecting the stanchion to the horizontal rail, wherein the knuckle assembly is adjustable to move the stanchion toward or away from the wall, enabling the mounting system to accommodate plumb variations in the wall, the knuckle assembly comprising:
      a rail bracket mountable to the horizontal rail;
      a stanchion bracket to which the stanchion is mounted;
      a fastener interconnecting the rail bracket and the stanchion bracket; and
      a biasing member disposed between the rail bracket and the stanchion bracket to bias the rail and stanchion brackets away from one another.

2. The mounting system of claim 1 including a wedge lock inserted between the knuckle assembly and the stanchion to lock the knuckle assembly and stanchion together.

3. The mounting system of claim 1 wherein the fastener is adjustable to increase or decrease the spacing between the rail bracket and the stanchion bracket.

4. The mounting system of claim 3 wherein the knuckle assembly is provided with minimum spacing between the rail bracket and the stanchion bracket.

5. The mounting system of claim 3 wherein the knuckle assembly and stanchion are mountable to the horizontal rail at substantially any selected position along a length of the horizontal rail such that the stanchion is selectively positionable in the horizontal direction relative to the wall.

6. The mounting system of claim 1 including a leveler assembly vertically mounted to a lower end of the stanchion, the leveler assembly comprising a bracket and an adjustable leveler foot, wherein the leveler foot is vertically adjustable to accommodate height variations in a floor.

7. The mounting system of claim 1 including a back leveler assembly horizontally mounted to a rear of the stanchion, the back leveler assembly comprising a bracket and an adjustable leveler foot, wherein the leveler foot is horizontally adjustable to move the stanchion toward or away from the wall to accommodate plumb variations in the wall.

8. The mounting system of claim 7 wherein the mounting system includes a plurality of the stanchions, a plurality of the knuckle assemblies, a plurality of the leveler assemblies, and a plurality of the back leveler assemblies.

* * * * *